US011496443B2

(12) United States Patent
Meier

(10) Patent No.: US 11,496,443 B2
(45) Date of Patent: Nov. 8, 2022

(54) MIDDLEWARE TO ENABLE END-TO-END PROCESSES WITH LIMITED NETWORK COMMUNICATION

(71) Applicant: SAP SE, Walldorf (DE)

(72) Inventor: Andreas Meier, Wilhermsdorf (DE)

(73) Assignee: SAP SE, Walldorf (DE)

( * ) Notice: Subject to any disclaimer, the term of this patent is extended or adjusted under 35 U.S.C. 154(b) by 253 days.

(21) Appl. No.: 16/917,209

(22) Filed: Jun. 30, 2020

(65) Prior Publication Data

US 2021/0409372 A1 Dec. 30, 2021

(51) Int. Cl.
*H04L 9/40* (2022.01)
*G06F 9/54* (2006.01)

(52) U.S. Cl.
CPC .............. *H04L 63/02* (2013.01); *G06F 9/547* (2013.01)

(58) Field of Classification Search
CPC ................................ H04L 63/02; G06F 9/547
See application file for complete search history.

(56) References Cited

U.S. PATENT DOCUMENTS

| | | | |
|---|---|---|---|
| 8,881,182 | B1 | 11/2014 | Jorgensen |
| 9,069,599 | B2 | 6/2015 | Martinez et al. |
| 9,762,563 | B2 | 9/2017 | Davis et al. |
| 2009/0313534 | A1* | 12/2009 | Davis ..................... G06Q 30/02 707/999.1 |
| 2011/0010759 | A1* | 1/2011 | Adler ....................... G06F 21/10 726/4 |
| 2011/0154376 | A1* | 6/2011 | Consul ..................... G06F 16/95 719/328 |
| 2014/0222885 | A1* | 8/2014 | Mohan ..................... H04L 63/02 709/201 |
| 2014/0380455 | A1 | 12/2014 | Kelly et al. |
| 2015/0026342 | A1* | 1/2015 | Chen ....................... G06F 9/5055 709/226 |

(Continued)

OTHER PUBLICATIONS

"Publish internal APIs to external users," from https://docs.microsoft.com/en-us/azure/architecture/example-scenario/apps/publish-internal-apis-externally, 9 pages, Mar. 12, 2019.

(Continued)

*Primary Examiner* — Jeong S Park
(74) *Attorney, Agent, or Firm* — Sterne, Kessler, Goldstein & Fox P.L.L.C.

(57) ABSTRACT

Disclosed herein are system, apparatus, method, and computer program product embodiments for securing inter-network communications. An embodiment operates by generating a task request to be performed in a first network environment. The embodiment further operates by transmitting the task request to an application located in a second network environment. The embodiment further operates by receiving a task package from the application. The embodiment further operates by determining whether the task package includes a positive task value and, if so, calling a task in the first network environment based on the task package. The embodiment further operates by generating a creation status associated with an execution of the task in the first environment and transmitting the creation status to the application. Subsequently, the embodiment further operates by generating a final status associated with the execution of the task and transmitting the final status to the application.

17 Claims, 7 Drawing Sheets

(56) References Cited

U.S. PATENT DOCUMENTS

2018/0014082 A1\* 1/2018 Daily ...................... H04L 69/16
2018/0198839 A1\* 7/2018 Demulder ............... H04L 67/51
2021/0240551 A1\* 8/2021 Joyce .................. G06F 11/3688

OTHER PUBLICATIONS

Khemmanivanh, S., "VPC Subnet Zoning Patterns for SAP on AWS, Part 2: Network Zoning," AWS for SAP, from https://aws.amazon.com/blogs/awsforsap/vpc-subnet-zoning-patterns-for-sap-on-aws-part-2-network-zoning/, 4 pages, Jun. 2, 2017.
Munns, C., "Introducing Amazon API Gateway Private Endpoints," Amazon API Gateway, AWS Compute Blog, from https://aws.amazon.com/blogs/awsforsap/vpc-subnet-zoning-patterns-for-sap-on-aws-part-2-network-zoning/, 12 pages, Jun. 14, 2018.

\* cited by examiner

MIDDLEWARE TO ENABLE END-TO-END PROCESSES WITH LIMITED NETWORK COMMUNICATION

BACKGROUND

Modern applications are increasingly stored and run in cloud platforms located outside of an entity's internal network. These applications may need to access the entity's internal network to accomplish operational tasks but often are prevented from doing so to maintain the security of the internal network. As a result, these applications cannot implement fully-automated end-to-end (E2E) processes for operational tasks.

BRIEF DESCRIPTION OF THE DRAWINGS

The accompanying drawings are incorporated herein and form a part of the specification.

In the drawings, like reference numbers generally indicate identical or similar elements. Additionally, generally, the left-most digit(s) of a reference number identifies the drawing in which the reference number first appears.

DETAILED DESCRIPTION

Figure 1A:
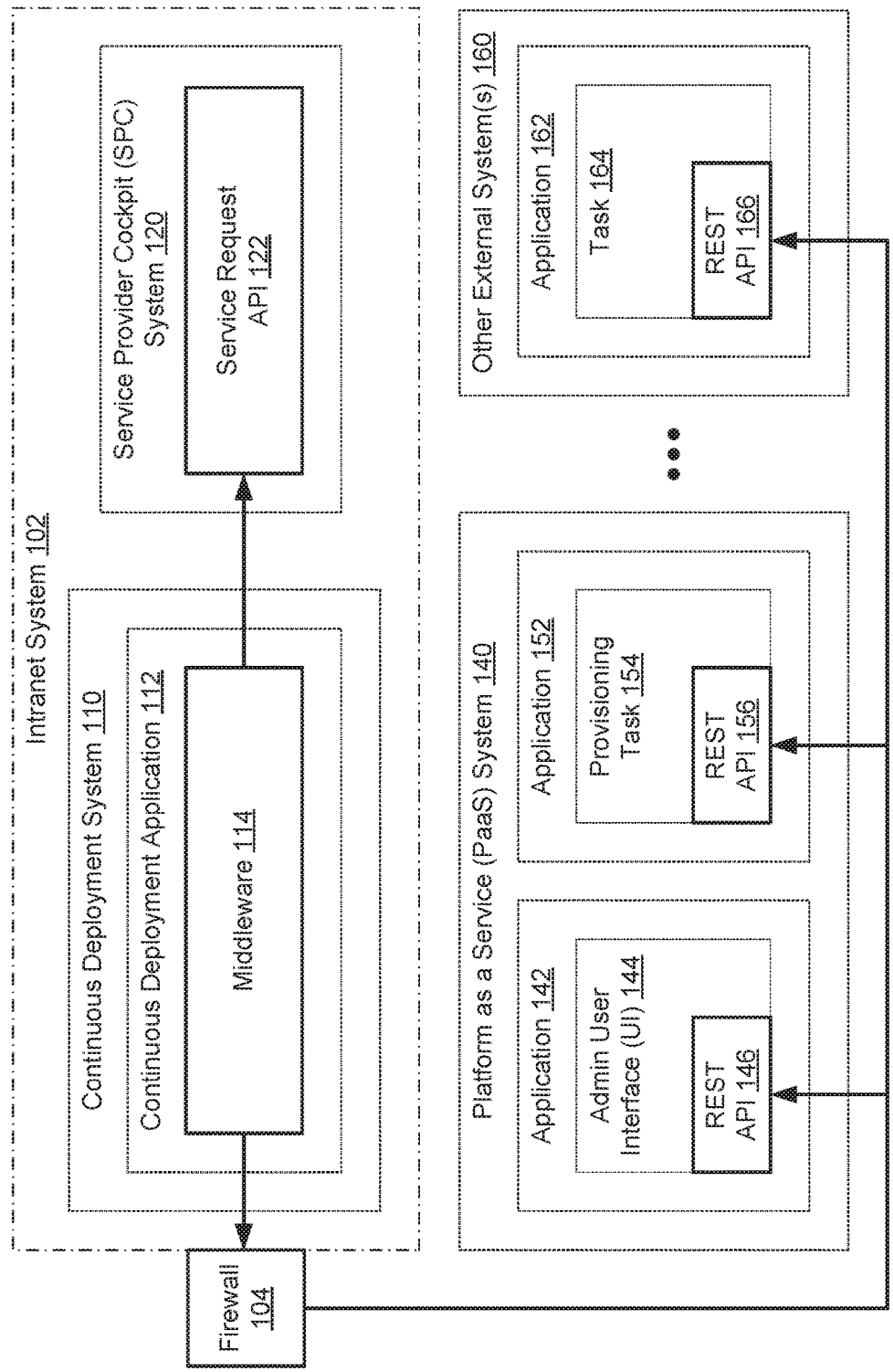
FIGS. 1A, 1B, and 1C are block diagrams of systems for securing inter-network communications, according to some embodiments.

Provided herein are system, apparatus, device, method and/or computer program product embodiments, and/or combinations and sub-combinations thereof, for securing inter-network communications using middleware to enable end-to-end (E2E) processes (e.g., full E2E automation of processes) with limited network communication. Further provided herein are system, apparatus, device, method and/or computer program product embodiments, and/or combinations and sub-combinations thereof, for enabling E2E processes with limited network communication using a representational state transfer (REST) application programming interface (API) for communication between an application and the middleware.

Cloud platform applications typically encounter a myriad of communication gaps that hinder the implementation of fully-automated E2E processes for operational tasks. One such communication gap is direct communication from an external network to an internal network where calling into the internal network from the external network can be highly restricted for security reasons. In some cases, externally-hosted cloud platform applications may even be forbidden from doing so. For example, an externally-hosted cloud platform application may need to trigger activities in systems running on internal infrastructure (e.g., to trigger activities for data onboarding). In another example, an externally-hosted cloud platform application may implement some kind of administrative user interface (admin UI) inside of that application that is used to trigger activities on the cloud platform (e.g., to increase the amount of running application servers), but management of the cloud platform must be performed on an internally-running infrastructure.

In contrast, the system, apparatus, device, method and/or computer program product embodiments, and/or combinations and sub-combinations thereof, described herein solve these technological problems by using middleware running internally to bypass these communication gaps. For example, internally-implemented middleware can frequently "ask" (e.g., based on rules) an external application's externally-implemented REST API endpoint for "work."

In some embodiments, middleware disposed in the internal network environment can provide a common or standardized API for communicating with external applications. For example, the middleware may enable the following communications flow: first, the middleware is communicating with an external application using this API; and, subsequently, the middleware is interpreting API call results and is communicating with an internal task processor (e.g., the target system) by using target system specific API. As a result, the middleware enables communication between external and internal systems in a standardized way for calling applications because the middleware is providing the interface for each of the individual task processors (e.g., to channel all interfaces into a common interface). Further, the middleware can share the reference implementation of the API endpoint of one application with other applications to reduce development effort. Further still, the application does not have to concern itself with the middleware, which can run substantially anywhere, can be implemented in substantially any kind of system, and is scalable.

In some embodiments, the middleware may support the following task types: (i) calling information technology (IT) processes in an internal service provider cockpit (e.g., to perform any kind of operational tasks); (ii) calling continuous deployment jobs (e.g., to trigger a continuous deployment pipeline to ship software); (iii) calling a platform as a service (PaaS) system environment manager (e.g., to configure services); any other suitable task types; and any combination thereof.

In some embodiments, the middleware may be implemented or supported as a central tool. In some embodiments, communication targets inside of the internal network may be implemented centrally, and the interface between the middleware and the communication targets may follow the requirements of the communications targets. In some embodiments, each external application may implement a counterpart of the middleware API. The interface between the communication user and the middleware may be implemented centrally and capable of being modified to support new or additional communication targets.

In some embodiments, the API of the external application may be configured to interact with different instances of middleware (e.g., for improved flexibility and better load on performance). In some embodiments, the middleware may check frequently for "something to do," as the external application may not send data directly or synchronously. The API may answer with a task package indicating "something to do" or "nothing to do, currently." In the case of "something to do," the external application may reply with the type of task to perform and optionally multiple "key": "value" pairs as data to be passed to the task. In some embodiments, the number of supported tasks may not be fixed; rather the number of supported tasks may be flexible enough for enhancements. In some embodiments, the middleware may update the external application when the task will be triggered with the status (e.g., in some cases, triggering may not be possible). In some embodiments, the middleware may update the external application when the task has been finished with the status and, optionally, log lines. For example, if available the middleware can transmit the log lines of the task process to the external application to make the call as transparent as possible. The middleware may be checking the API frequently for tasks and, if the frequency is not sufficient, the API may have an option to modify the frequency. In some embodiments, data exchanged between the middleware and the API may be tagged by an indicator to support the performance of multiple tasks in parallel (e.g., to be able to link all information together).

In one illustrative and non-limiting example, middleware implemented in an internal network begins by establishing communication with the REST API endpoint of an external application, which can be implemented in an external cloud platform or any other suitable external environment (e.g., opening a web page from an internal computing device running on an external web server). As the middleware may not be able to react in-time, the external application implementing the REST API endpoint can save task packages in an externally-implemented database or any other suitable storage device or technique.

In response to the middleware asking the REST API for a task, the REST API can select a task package (e.g., including backup data or any other suitable data associated with a task to be performed by an internal system) from the database and transmit the task package to the middleware using a secure communications channel (e.g., an open stream that, in some embodiments, can be opened only in one direction but thereafter can send data in both directions). The middleware can receive the task package from the REST API and call the internally-implemented processor of the task desired to be executed by the application (e.g., as indicated by the task package). The processor may be part of, for example, an enterprise resource planning (ERP) system, a cloud platform controller, or any other suitable processor running internally.

When the task processor begins processing the task, it can send an initial status back to the middleware. The middleware can receive the initial status from the task processor and send the initial status (or, in some embodiments a "creation status" generated based thereon) to the REST API indicating that task has been triggered or has failed (including, but not limited to, the failure modes or diagnostic data). The REST API can provide the initial status to the application, which uses this information to change (e.g., update) the status of the task package in the database.

When the task processor finishes processing the task, it can send a final status back to the middleware, which may be waiting in parallel for this status. The middleware can receive the final status from the task processor and can send the final status (or, in some embodiments a "final status" generated based thereon) to the REST API indicating that the task has finished and including status and other data provided by the task processor. The REST API can provide the final status to the application, which uses this information to change (e.g., update) the status of the task package in the database.

Subsequently, the next iteration of "picking up task package" (e.g., "asking for tasks") starts. In some embodiments, the embodiments disclosed herein provide for multiple kinds of parallelism depending on the workload and the types of tasks and task processors implemented internally. In some embodiments, the embodiments disclosed herein further provide for configuring the internally-executed tasks and internally-implemented task processors to provide for the features described herein and combinations thereof.

FIG. 1A is a block diagram of a system 100A for securing inter-network communications, according to some embodiments. System 100A can include an internal network environment that includes an intranet system 102. Intranet system 102 can include a continuous deployment system 110, a service provider cockpit (SPC) system 120, any other suitable system or processor, or a combination thereof. In some embodiments, continuous deployment system 110 can include a continuous deployment host that includes a continuous deployment application 112. In some embodiments, continuous deployment application 112 can include middleware 114. In some embodiments, middleware 114 can include a continuous deployment poll script that includes a plurality of continuous deployment tasks and can be implemented in the same programming language as a continuous deployment pipeline implemented by continuous deployment system 110. In some embodiments, middleware 114 is configurable and can execute multiple poll scripts to better separate its workload.

In some embodiments, SPC system 120 can include a service request API 122 configured to communicate with middleware 114 (e.g., direct connection to intranet system 102 may not be possible due to security restrictions). In some embodiments, intranet system 102 can include, or be communicatively coupled to, a firewall 104 configured to prohibit external applications (e.g., applications 142, 152, and 162; any other suitable application; or any combination thereof) from accessing intranet system 102 other than through middleware 114 (e.g., without opening a general gate).

In some embodiments, continuous deployment system 110 may be used to implement a continuous deployment pipeline for external applications such as applications 142, 152, and 162. As used herein, the term "continuous deployment pipeline" refers to a complete, fully automated process chain (e.g., operated by continuous deployment system 110), that includes uploading new or changed source code (e.g., to a software source repository), performing a build of the software (e.g., via containerization), performing automated checks and tests of the software, and, if the automated checks and tests are successful, releasing and deploying the software to a user environment. In some embodiments, a continuous deployment pipeline can include a loop including an automated building phase, an automated testing phase, an automated release phase, and an automated deployment phase. In some embodiments, the automated building phase of a continuous deployment pipeline can include: (i) checking out the code; (ii) running static analysis and testing; (iii) building artifacts; (iv) building images; (v) pushing the images to the registry; any other suitable operation; or any combination thereof. In some embodiments, the automated testing phase of a continuous deployment pipeline can include: (i) install the release under test; (ii) confirm that the release under test is running; (iii) run functional tests; (iv) remove the release under test; any other suitable operation; or any combination thereof. In some embodiments, the automated release phase of a continuous deployment pipeline can include: (i) pull the image of the release under test; (ii) tag the image as a specific release; (iii) tag the image as the latest release; (iv) push the image of the specific release; (v) push the image of the latest release; (vi) package the chart; (vii) push the chart; any other suitable operation; or any combination thereof. In some embodiments, the automated deployment phase of a continuous deployment pipeline can include: (i) upgrade the production release; (ii)

run production tests; (iii) rollback in case of failure; any other suitable operation; or any combination thereof.

System 100A can further include an external network environment that includes a platform as a service (PaaS) system 140, one or more other external systems 160, or any combination thereof. As will be understood by a person of ordinary skill in the art, PaaS system 140 is not limited to a PaaS system and, in some embodiments, can additionally or alternatively include a backend as a service (BaaS) system, a mobile backend as a service (MBaaS) system, a content as a service (CaaS) system, a digital content as a service (DCaaS) system, a desktop as a service (DaaS) system, a framework as a service (FaaS) system, an infrastructure as a service (IaaS) system, a software as a service (SaaS) system, a managed software as a service (MSaaS) system, any other suitable cloud platform or "as a service" system, or any combination thereof.

In some embodiments, PaaS system 140 can include an application 142, an application 152, any other suitable application, or any combination thereof. Application 142 can include an admin UI 144 and a REST API 146 configured to communicate with intranet system 102 through firewall 104 and middleware 114. Application 152 can include a provisioning task 154 and a REST API 156 configured to communicate with intranet system 102 through firewall 104 and middleware 114.

In some embodiments, one or more other external systems 160 can include an application 162, any other suitable application, or any combination thereof. Application 162 can include a task 164 (e.g., any suitable task) and a REST API 166 configured to communicate with intranet system 102 through firewall 104 and middleware 114.

In a first illustrative and non-limiting example described with reference to FIG. 1A, application 152 may need to execute provisioning procedures in SPC system 120 as part of provisioning task 154 (e.g., also referred to as an "SPC task") while running externally in PaaS system 140. For security reasons, such provisioning may only be performed in intranet system 102 (e.g., accessible via service request API 122). Application 152 can store electronic information associated with the provisioning procedures in a database and wait for a task request from middleware 114. Separately, middleware 114 can generate a task request. The task request can include, for example, a universally unique identifier (UUID); a status (e.g., "Requesting for tasks"); a detailed status that includes a step code (e.g., "00") and step text (e.g., "Requesting for tasks"); any other suitable electronic information or data; or any combination thereof. Middleware 114 then can transmit the task request to REST API 156 associated with application 152 based on a task request transmission frequency (e.g., about every 1.0 second, 10.0 seconds, 1.0 minute, 5.0 minutes, 1.0 hour, 24.0 hours, or any other suitable frequency).

In some embodiments, middleware 114 can modify the task request transmission frequency based on one or more service level agreements (SLAs) (e.g., indicating that it must process tasks in a given time even if the given workload could be handled with much lower frequency), overall workload, a maintenance cycle (e.g., pause processing for a given timeframe during a planned maintenance cycle of, for example, SPC system 120 or continuous deployment system 130), manual input (e.g., by admin UI 144), any other suitable data or electronic information, or any combination thereof. For example, every time the workload of a task package (e.g., task package 320) is greater than zero, middleware 114 can increase the frequency to process tasks and thus increase the task request transmission frequency and decrease the cycle time, and vice versa. Illustratively, an increase in the frequency to process tasks from one task per hour to two tasks per hour can decrease the cycle time from 60 minutes to 30 minutes. In another example, middleware 114 can receive or obtain an SLA indicating that it must process tasks in a given time. Subsequently, middleware 114 can modify the task request transmission frequency based on the SLA and, optionally, further based on overall workload (e.g., when the overall workload exceeds an overall workload threshold value).

Application 152 can receive the task request from middleware 114 and, in response, retrieve the electronic information associated with the provisioning procedures and generate an SPC task package (e.g., an SPC working block) based thereon. The SPC task package can include, for example, a positive task value (e.g., "Work": "true"), a UUID (e.g., an SPC working block identifier to map results to related records), a workload value (e.g., a remaining number of SPC working blocks for use in starting parallel threads, if needed), a task type (e.g., an SPC task type), and a set of task parameters (e.g., a set of SPC task parameters indicating that an SPC task is to be performed by SPC system 120). REST API 156 may then transmit the SPC task package to middleware 114.

Middleware 114 can receive the SPC task package from REST API 156 and determine whether the SPC task package includes a positive task value indicating that there is a task to be performed in intranet system 102. In this example, middleware 114 can determine that the SPC task package includes a positive task value indicating that an SPC task is to be performed by SPC system 120 and, in response, generate an SPC task call based on the SPC task type and the set of SPC task parameters. Middleware 114 then can transmit the SPC task call to service request API 122 of SPC system 120.

SPC system 120 can receive the SPC task call from middleware 114 via service request API 122 and begin to process the SPC task. In association with the initial processing of the SPC task, SPC system 120 can generate a first status that includes electronic information indicative of the success or failure (including, but not limited to, the failure modes or diagnostic data) of the creation of the SPC task by SPC system 120. SPC system 120 then can transmit the first status to middleware 114 via service request API 122.

Middleware 114 can receive the first status from service request API 122 and generate a creation status based thereon indicating that the requested SPC task has been started. The creation status can include, for example, a UUID (e.g., the SPC working block identifier); a status (e.g., "Creation started successfully" or "Creation started failed"); a detailed status that includes a step code (e.g., "30"), step text (e.g., "Creation Status"), a result code (e.g., "0" for no error, "8" for error), and result text (e.g., detailed electronic information about the result of the creation of the SPC task); a log (e.g., a text block); any other suitable electronic information or data; or any combination thereof. Middleware 114 then can transmit the creation status to REST API 156 associated with application 152.

REST API 156 can receive the creation status from middleware 114 and modify electronic information, data, or records associated with the SPC task, provisioning task 154, or both based thereon. For example, REST API 156 can provide the creation status to application 152, which can process the creation status to update the status of the SPC task package, the electronic information associated with the SPC task, or both in the database associated with application 152.

Subsequently, SPC system 120 may finish processing the SPC task. In association with the final processing of the SPC task, SPC system 120 can generate a second status that includes electronic information indicative of the success or failure (including, but not limited to, the result codes and text) of the completion of the SPC task by SPC system 120. In some embodiments, the second status can include electronic information indicating that the SPC task has finished and including status and other data provided by SPC system 120. SPC system 120 then can transmit the second status to middleware 114 via service request API 122. In some embodiments, middleware 114 may be waiting in parallel for the second status.

Middleware 114 can receive the second status from service request API 122 and generate a final status based thereon indicating that the requested SPC task has been finished. The final status can include, for example, a UUID (e.g., the SPC working block identifier); a status (e.g., "Final success" or "Final failed"); a detailed status that includes a step code (e.g., "40"), step text (e.g., "Final Status"), a result code (e.g., "0" for no error, "8" for error), result text (e.g., detailed electronic information about the result of the completion of the SPC task), a status code (e.g., return code associated with the processing of the SPC task), and a status description (e.g., electronic information describing the return code); a log (e.g., a text block); any other suitable electronic information or data; or any combination thereof. Middleware 114 then can transmit the final status to REST API 156 associated with application 152.

REST API 156 can receive the final status from middleware 114 and modify electronic information, data, or records associated with the SPC task, provisioning task 154, or both based thereon. For example, REST API 156 can provide the final status to application 152, which can process the final status to update the status of the SPC task package, the electronic information associated with the SPC task, or both in the database associated with application 152.

Figure 1B:
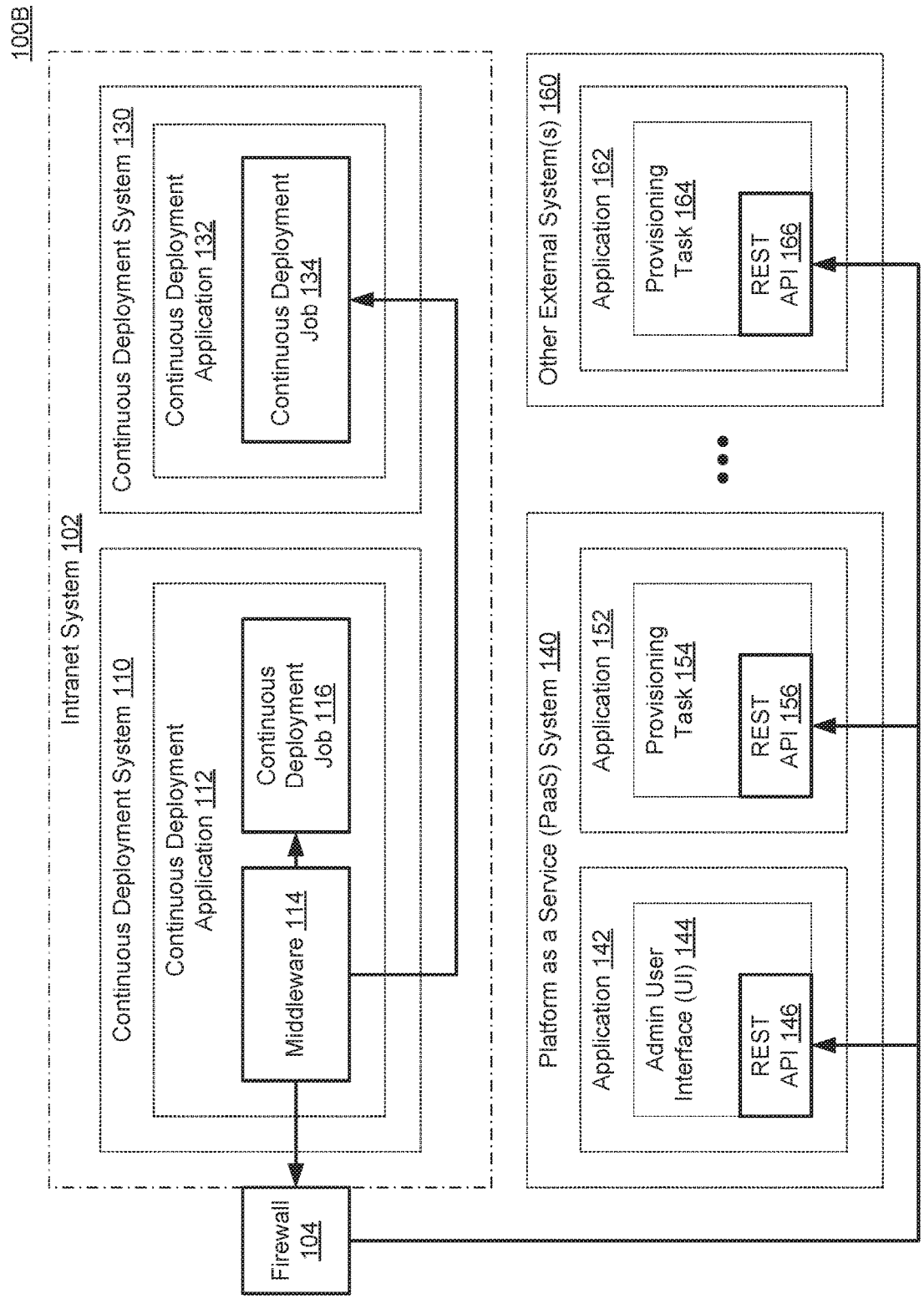

FIG. 1B is a block diagram of a system 100B for securing inter-network communications, according to some embodiments. In some embodiments, system 100B may be an extended configuration of system 100A described with reference to FIG. 1A that includes additional or alternative functionality. For example, in system 100B, continuous deployment application 112 of continuous deployment system 110 can include a continuous deployment job 116 configured to communicate with middleware 114. Further in system 100B, intranet system 102 can include a continuous deployment system 130 (e.g., a second instance of continuous deployment system 110), any other suitable system or processor, or a combination thereof. In some embodiments, continuous deployment system 130 can include a continuous deployment host that includes a continuous deployment application 132. In some embodiments, continuous deployment application 132 can include a continuous deployment job 134 configured to communicate with middleware 114.

In a second illustrative and non-limiting example described with reference to FIG. 1B, application 152 may need to execute one or more continuous deployment scripts in continuous deployment system 110 for various reasons while running externally in PaaS system 140. For security reasons, such continuous deployment scripts may only be executed in intranet system 102 (e.g., via continuous deployment job 116 or 134). Application 152 can store electronic information associated with the one or more continuous deployment scripts in a database and wait for a task request from middleware 114. Separately, middleware 114 can generate a task request. The task request can include, for example, a universally unique identifier (UUID); a status (e.g., "Requesting for tasks"); a detailed status that includes a step code (e.g., "00") and step text (e.g., "Requesting for tasks"); any other suitable electronic information or data; or any combination thereof. Middleware 114 then can transmit the task request to REST API 156 associated with application 152 based on a task request transmission frequency (e.g., about every 1.0 second, 10.0 seconds, 1.0 minute, 5.0 minutes, 1.0 hour, 24.0 hours, or any other suitable frequency).

Application 152 can receive the task request from middleware 114 and, in response, retrieve the electronic information associated with the one or more continuous deployment scripts and generate a continuous deployment task package (e.g., a continuous deployment working block) based thereon. The continuous deployment task package can include, for example, a positive task value (e.g., "Work": "true"), a UUID (e.g., a continuous deployment working block identifier to map results to related records), a workload value (e.g., a remaining number of continuous deployment working blocks for use in starting parallel threads, if needed), a task type (e.g., a continuous deployment task type), and a set of task parameters (e.g., a set of continuous deployment task parameters indicating that a continuous deployment task is to be performed by continuous deployment system 110). REST API 156 may then transmit the continuous deployment task package to middleware 114.

Middleware 114 can receive the continuous deployment task package from REST API 156 and determine whether the continuous deployment task package includes a positive task value indicating that there is a task to be performed in intranet system 102. In this example, middleware 114 can determine that the continuous deployment task package includes a positive task value indicating that one or more continuous deployment tasks are to be performed by continuous deployment system 110, continuous deployment system 130, or both. In response, middleware 114 can generate one or more continuous deployment task calls based on the continuous deployment task type and the set of continuous deployment task parameters. Middleware 114 then can transmit the one or more continuous deployment task calls to continuous deployment job 116 of continuous deployment application 112 in continuous deployment system 110, continuous deployment job 134 of continuous deployment application 132 in continuous deployment system 130, or a combination thereof.

Continuous deployment system 110 or 130 can receive a continuous deployment task call from middleware 114 via continuous deployment job 116 or 134, respectively, and begin to process the continuous deployment task. In association with the initial processing of the continuous deployment task, continuous deployment system 110 or 130 can generate a first status that includes electronic information indicative of the success or failure (including, but not limited to, the failure modes or diagnostic data) of the creation of the continuous deployment task by continuous deployment system 110 or 130, respectively. Continuous deployment system 110 or 130 then can transmit the first status to middleware 114 via continuous deployment job 116 or 134, respectively.

Middleware 114 can receive the first status from continuous deployment job 116 or 134 and generate a creation status based thereon indicating that the requested continuous deployment task has been started. The creation status can include, for example, a UUID (e.g., the continuous deployment working block identifier); a status (e.g., "Creation started successfully" or "Creation started failed"); a detailed status that includes a step code (e.g., "30"), step text (e.g., "Creation Status"), a result code (e.g., "0" for no error, "8" for error), and result text (e.g., detailed electronic information about the result of the creation of the continuous deployment); a log (e.g., a text block); any other suitable electronic information or data; or any combination thereof. Middleware 114 then can transmit the creation status to REST API 156 associated with application 152.

REST API 156 can receive the creation status from middleware 114 and modify electronic information, data, or records associated with the one or more continuous deployment scripts based thereon. For example, REST API 156 can provide the creation status to application 152, which can process the creation status to update the status of the continuous deployment task package, the electronic information associated with the one or more continuous deployment scripts, or both in the database associated with application 152.

Subsequently, continuous deployment system 110 or 130 may finish processing the continuous deployment task. In association with the final processing of the continuous deployment task, continuous deployment system 110 can generate a second status that includes electronic information indicative of the success or failure (including, but not limited to, the result codes and text) of the completion of the continuous deployment task by continuous deployment system 110 or 130, respectively. In some embodiments, the second status can include electronic information indicating that the continuous deployment task has finished and including status and other data provided by continuous deployment system 110 or 130. Continuous deployment system 110 or 130 then can transmit the second status to middleware 114 via continuous deployment job 116 or 134, respectively. In some embodiments, middleware 114 may be waiting in parallel for the second status.

Middleware 114 can receive the second status from continuous deployment job 116 or 134 and generate a final status based thereon indicating that the requested continuous deployment task has been finished. The final status can include, for example, a UUID (e.g., the continuous deployment working block identifier); a status (e.g., "Final success" or "Final failed"); a detailed status that includes a step code (e.g., "40"), step text (e.g., "Final Status"), a result code (e.g., "0" for no error, "8" for error), result text (e.g., detailed electronic information about the result of the completion of the continuous deployment task), a status code (e.g., return code associated with the processing of the continuous deployment task), and a status description (e.g., electronic information describing the return code); a log (e.g., a text block); any other suitable electronic information or data; or any combination thereof. Middleware 114 then can transmit the final status to REST API 156 associated with application 152.

REST API 156 can receive the final status from middleware 114 and modify electronic information, data, or records associated with the one or more continuous deployment scripts based thereon. For example, REST API 156 can provide the final status to application 152, which can process the final status to update the status of the continuous deployment task package, the electronic information associated with the one or more continuous deployment scripts, or both in the database associated with application 152.

Figure 1C:
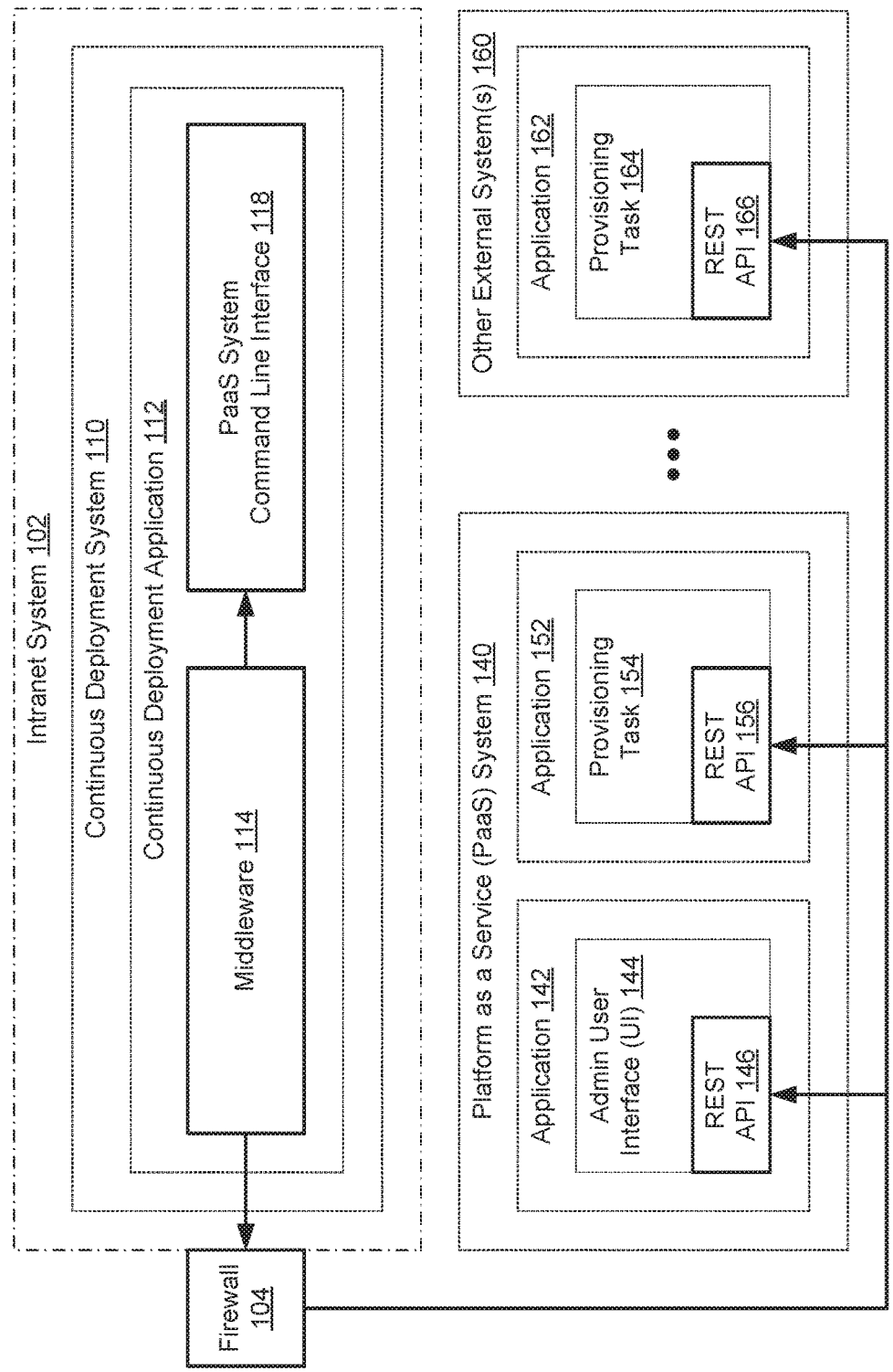

FIG. 1C is a block diagram of a system 100C for securing inter-network communications, according to some embodiments. In some embodiments, system 100C may be an extended configuration of system 100A described with reference to FIG. 1A, system 100B described with reference to FIG. 1B, or both that includes additional or alternative functionality. For example, in system 100C, continuous deployment application 112 of continuous deployment system 110 can include a PaaS system command line interface 118 configured to communicate with middleware 114.

In a third illustrative and non-limiting example described with reference to FIG. 1C, application 142 may need to execute an admin UI task (e.g., data configuration and services) in continuous deployment system 110 to manage services (e.g., database settings, application server) used by application 142 as part of admin UI 144 while running externally in PaaS system 140. For security reasons, such service management may only be performed in intranet system 102 (e.g., accessible via PaaS system command line interface 118). Application 142 can store electronic information associated with the admin UI task in a database and wait for a task request from middleware 114. Separately, middleware 114 can generate a task request. The task request can include, for example, a universally unique identifier (UUID); a status (e.g., "Requesting for tasks"); a detailed status that includes a step code (e.g., "00") and step text (e.g., "Requesting for tasks"); any other suitable electronic information or data; or any combination thereof. Middleware 114 then can transmit the task request to REST API 146 associated with application 142 based on a task request transmission frequency (e.g., about every 1.0 second, 10.0 seconds, 1.0 minute, 5.0 minutes, 1.0 hour, 24.0 hours, or any other suitable frequency).

Application 142 can receive the task request from middleware 114 and, in response, retrieve the electronic information associated with the admin UI task and generate an admin UI task package (e.g., an admin UI working block) based thereon. The admin UI task package can include, for example, a positive task value (e.g., "Work": "true"), a UUID (e.g., an admin UI working block identifier to map results to related records), a workload value (e.g., a remaining number of admin UI working blocks for use in starting parallel threads, if needed), a task type (e.g., an admin UI task type), and a set of task parameters (e.g., a set of admin UI task parameters indicating that an admin UI task is to be performed by continuous deployment system 110). REST API 146 may then transmit the admin UI task package to middleware 114.

Middleware 114 can receive the admin UI task package from REST API 146 and determine whether the admin UI task package includes a positive task value indicating that there is a task to be performed in intranet system 102. In this example, middleware 114 can determine that the admin UI task package includes a positive task value indicating that an admin UI task is to be performed by continuous deployment system 110 and, in response, generate an admin UI task call based on the admin UI task type and the set of admin UI task parameters. Middleware 114 then can transmit the admin UI task call to PaaS system command line interface 118 of continuous deployment system 110.

Continuous deployment system 110 can receive the admin UI task call from middleware 114 via PaaS system command line interface 118 and begin to process the admin UI task. In association with the initial processing of the admin UI task, continuous deployment system 110 can generate a first status that includes electronic information indicative of the success or failure (including, but not limited to, the failure modes or diagnostic data) of the creation of the admin UI task by continuous deployment system 110. Continuous deployment system 110 then can transmit the first status to middleware 114 via PaaS system command line interface 118.

Middleware 114 can receive the first status from PaaS system command line interface 118 and generate a creation status based thereon indicating that the requested admin UI task has been started. The creation status can include, for example, a UUID (e.g., the admin UI working block identifier); a status (e.g., "Creation started successfully" or "Creation started failed"); a detailed status that includes a step code (e.g., "30"), step text (e.g., "Creation Status"), a result code (e.g., "0" for no error, "8" for error), and result text (e.g., detailed electronic information about the result of the creation of the admin UI task); a log (e.g., a text block); any other suitable electronic information or data; or any combination thereof. Middleware 114 then can transmit the creation status to REST API 146 associated with application 142.

REST API 146 can receive the creation status from middleware 114 and modify electronic information, data, or records associated with the admin UI task, admin UI 144, or both based thereon. For example, REST API 146 can provide the creation status to application 142, which can process the creation status to update the status of the admin UI task package, the electronic information associated with the admin UI task, or both in the database associated with application 142.

Subsequently, continuous deployment system 110 may finish processing the admin UI task. In association with the final processing of the admin UI task, continuous deployment system 110 can generate a second status that includes electronic information indicative of the success or failure (including, but not limited to, the result codes and text) of the completion of the admin UI task by continuous deployment system 110. In some embodiments, the second status can include electronic information indicating that the admin UI task has finished and including status and other data provided by continuous deployment system 110. Continuous deployment system 110 then can transmit the second status to middleware 114 via PaaS system command line interface 118. In some embodiments, middleware 114 may be waiting in parallel for the second status.

Middleware 114 can receive the second status from PaaS system command line interface 118 and generate a final status based thereon indicating that the requested admin UI task has been finished. The final status can include, for example, a UUID (e.g., the admin UI working block identifier); a status (e.g., "Final success" or "Final failed"); a detailed status that includes a step code (e.g., "40"), step text (e.g., "Final Status"), a result code (e.g., "0" for no error, "8" for error), result text (e.g., detailed electronic information about the result of the completion of the admin UI task), a status code (e.g., return code associated with the processing of the admin UI task), and a status description (e.g., electronic information describing the return code); a log (e.g., a text block); any other suitable electronic information or data; or any combination thereof. Middleware 114 then can transmit the final status to REST API 146 associated with application 142.

REST API 146 can receive the final status from middleware 114 and modify electronic information, data, or records associated with the admin UI task, admin UI 144, or both based thereon. For example, REST API 146 can provide the final status to application 142, which can process the final status to update the status of the admin UI task package, the electronic information associated with the admin UI task, or both in the database associated with application 142.

Figure 2:
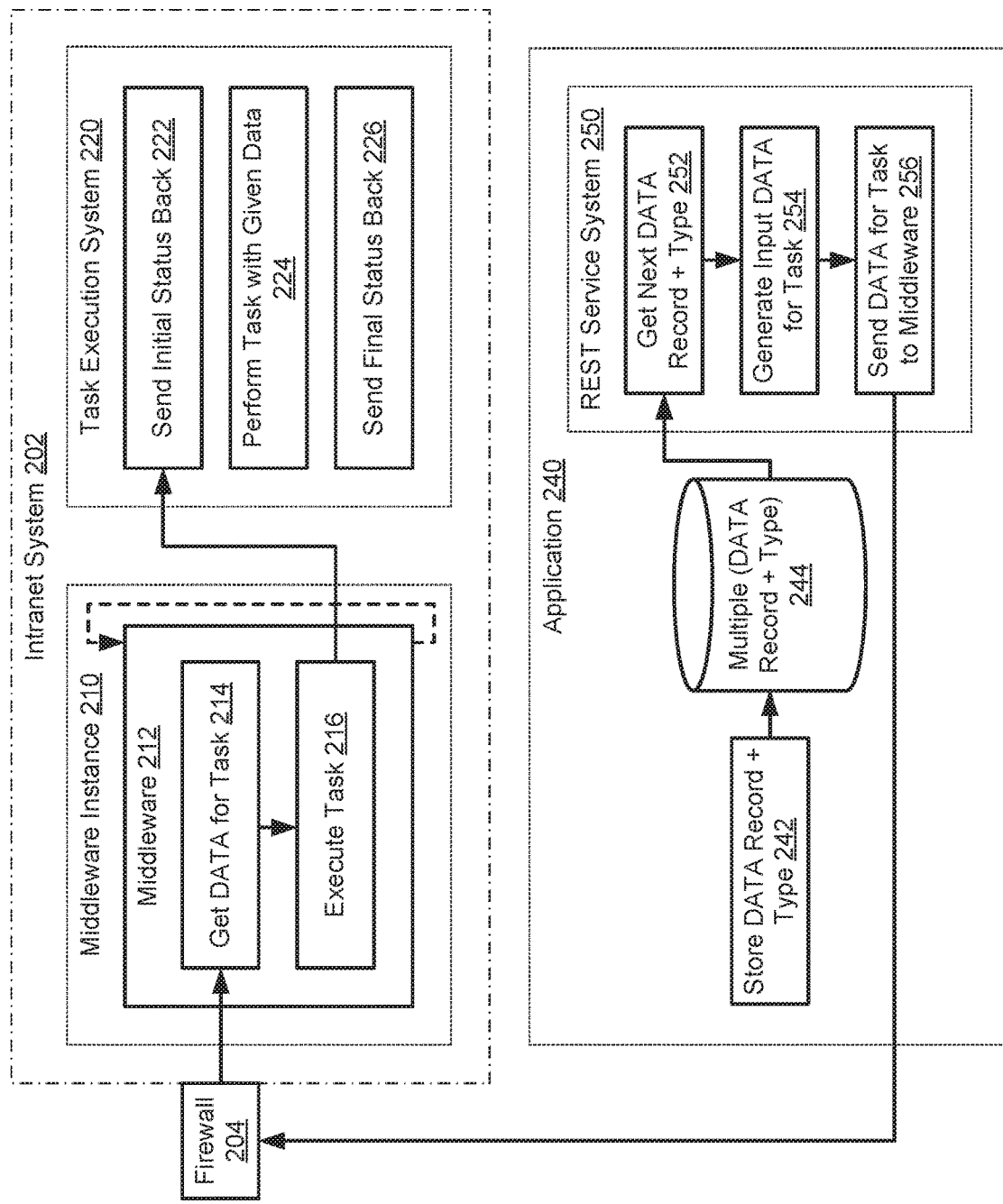
FIG. 2 is a block diagram of another system for securing inter-network communications, according to some embodiments.

FIG. 2 is a block diagram of a system 200 for securing inter-network communications, according to some embodiments. System 200 can include an application 240 disposed in an external network environment. Application 240 can include a database and a REST service system 250. System 200 can further include an intranet system 202 including middleware instance 210 and task execution system 220. Middleware instance 210 can include middleware 212 (e.g., including a poll script) configured to communicate with REST service system 250 through a firewall 204 disposed between intranet system 202 and application 240. In some embodiments, system 200 can include a middleware instance for each external application or application type (e.g., a first middleware instance having a first middleware component for a first external application, a second middleware instance having a second middleware component for a second external application, and so forth). In some embodiments, middleware 212 can include a poll script that includes a plurality of tasks and is implemented in the same programming language as task execution system 220. In some embodiments, middleware 212 is configurable and can execute multiple poll scripts to better separate its workload. Further, some of the steps or operations described with reference to FIG. 2 may be performed simultaneously, or in a different order than shown in FIG. 2, as will be understood by a person of ordinary skill in the art.

At 242, application 240 can store a data record and type. At 244, application 240 can store multiple data records and types in a database. At 252, REST service system 250 can get the next data record and type. At 254, REST service system 250 can generate input data for the task. At 256, REST service system 250 can send data for the task through firewall 204 to middleware 212. In some embodiments, REST service system 250 can send the data for the task to middleware 212 in response to receipt of a task request from middleware 212.

At 214, middleware 212 can get the data for the task. At 216, middleware 212 executes the task. At 222, task execution system 220 can send an initial status back to middleware 212, which can send the initial status (or a modified version thereof) back to REST service system 250. At 224, task execution system 220 performs the task based on the given data. At 226, task execution system 220 can send a final status back to middleware 212, which can send the final status (or a modified version thereof) back to REST service system 250. Middleware 212 then can proceed to the next iteration of getting data for the next task (e.g., requesting for tasks based on a task request transmission frequency).

Figure 3:
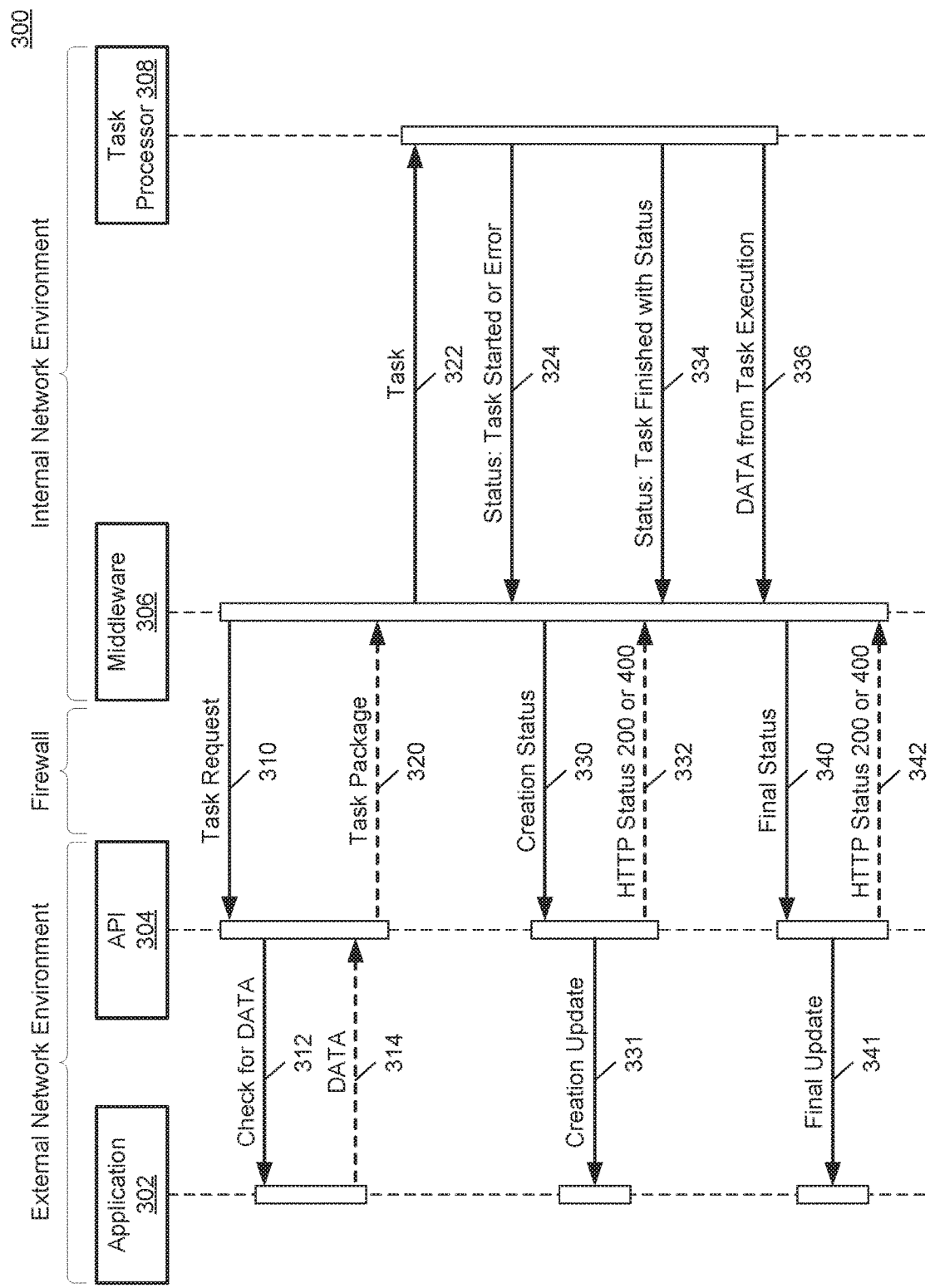
FIG. 3 is a block diagram of another system for securing inter-network communications, according to some embodiments.

FIG. 3 is a block diagram of a system 300 for securing inter-network communications, according to some embodiments. System 300 can include an application 302 (e.g., including or associated with one or more databases) and an API 304 (e.g., a REST API) disposed in an external network environment. System 300 can further include middleware 306 (e.g., including a poll script) and a task processor 308 disposed in an internal network environment. Middleware 306 may be configured to communicate with API 304 through a firewall between the internal and external network environments.

In an illustrative and non-limiting example, middleware 306 can generate a task request 310 (e.g., a "task request" JavaScript Object Notation (JSON) block). In an embodiment, middleware 306 can generate task request 310 according to following example pseudocode:

```
{
    "UUID":         "<value>",              // opt | Identifier (e.g., to instantiate different
                                            //       Worker)
    "Status":       "Requesting for tasks", // opt | Human readable text to show in log file
    "DetailedStatus": {
        "stepCode": "00",                   // mand
        "stepText": "Requesting for tasks"  // opt | Human readable text to show in log file
    }
}
```

In some embodiments, the term "mand" refers to data that may be mandatory in the case of a POST-request. In some embodiments, the term "opt" refers to data that may be optional in the case of a POST-request.

Middleware 306 can transmit task request 310 to API 304. API 304 can receive task request 310 from middleware 306, generate a check for data 312, and transmit check for data 312 to application 302. Application 302 can receive check for data 312 from API 304, generate or retrieve data 314, and transmit data 314 to API 304. API 304 can receive data 314 and generate a task package 320 (e.g., a "working block" JSON block) based on data 314. In some embodiments, API 304 can generate only one task package per call.

In some embodiments, task package 320 can include a positive task value (e.g., "something to do"; "Work": "true") together with an amount of additional working blocks, a task type, and a set of task parameters indicative of a task to be performed in the internal network environment (e.g., because middleware 306 may be mapping task type against the correct method to be used to communicate with the correct task processor). In an embodiment, API 304 can generate task package 320 having a positive task value according to following example pseudocode:

304 can generate task package 320 having a negative task value according to following example pseudocode:

```
{
    "Work": "false",  // mand | Nothing to do
}
```

API 304 can transmit task package 320 to middleware 306. Middleware 306 can receive task package 320 and determine whether task package 320 includes a positive task value indicating that there is a task to be performed by task processor 308. If not, middleware 306 can proceed to the next iteration of requesting for tasks based on a task request transmission frequency. If so, middleware 306 can call task 322 to be executed by task processor 308.

Task processor 308 can receive the call for task 322 from middleware 306 and executes task 322. Task processor 308 can generate a status 324 associated with the initial execution of the task (e.g., "Task Started" or "Error") and transmit status 324 to middleware 306. Middleware 306 can receive status 324 and generate, based on status 324, a creation status 330 indicating that the requested task has been started

```
{
    "Work":             "true",     // mand | Something to do
    "UUID":             "<value>",  // mand | Working block identifier (e.g., to map result
                                    //        to related record)
    "Workload":         "<value>",  // mand | Remaining number of Working blocks (e.g.,
                                    //        to start parallel threads)
    "<TaskType>": {                 // Identifier of what to do
        "<TaskParameter1>": "<value>",  // mand | Parameter 1
        "<TaskParameterN>": "<value>",  // mand | Parameter N
        "synchronous":      "<value>"   // opt | default 'true' | Wait until Job is finished
    }
}
```

In other embodiments, task package 320 may include a negative task value (e.g., "nothing to do"; "Work": "false") indicating that there is no task to be performed in the internal network environment at that time. In an embodiment, API successfully or failed with information provided by task processor 308. In an embodiment, middleware 306 can generate creation status 330 according to the following example pseudocode:

```
{
    "UUID":     "<value>",  // mand | Working block identifier (e.g., to map
                            //        result to related record)
    "Status":   "<value>",  // mand | 'Creation started successfully' or
                            //        'Creation started failed'
    "DetailedStatus": {
        "stepCode":   "30",               // mand
        "stepText":   "Creation Status",  // opt | Human readable text to show in log file
        "resultCode": "0" or "8",         // mand | '0' -> ok / '8' -> error
        "resultText": "<value>",          // opt | Detailed information about Result
```

```
    "statusCode":        "",        // opt | not used
    "statusDescription": ""         // opt | not used
  },
  "Log":                 "<value>"  // opt | Text-Block (e.g., single lines separated by
                                    //       '\n')
}
```

Middleware 306 can transmit creation status 330 to API 304. API 304 can receive creation status 330 and provide electronic information included in or associated with creation status 330 to application 302 in the form of a creation update 331. Application 302 can process creation update 331 to update the status of the task package, the electronic information associated with the task, or both in one or more databases associated with application 302. In some aspects, application 302 can generate a response 332 that includes a hypertext transfer protocol (HTTP) status 200 or 400. API 304 can transmit response 332 to middleware 306.

Subsequently, task processor 308 can generate a status 334 associated with the final execution of the task (e.g., "Task Finished" with "Status") and transmit status 334 to middleware 306. Task processor 308 can also transmit data 336 (e.g., results) associated with the execution of the task 322 to middleware 306.

Middleware 306 can receive status 334 and data 336 and generate, based on status 334 and data 336, a final status 340 indicating that the requested task has been finished successfully or failed with information provided by task processor 308 and, optionally, log lines. In an embodiment, middleware 306 can generate final status 340 according to the following example pseudocode:

```
{
  "UUID":                "<value>",     // mand | Working block identifier (e.g., to map
                                        //        result to related record)
  "Status":              "<value>",     // mand | 'Final success' or 'Final failed'
  "DetailedStatus": {
    "stepCode":          "40",          // mand
    "stepText":          "Final Status", // opt | Human readable text to show in log file
    "resultCode":        "0" or "8",    // mand | '0' -> ok / '8' -> error
    "resultText":        "<value>",     // opt | Detailed information about Result
    "statusCode":        "<value>",     // opt | ReturnCode handed over from Task
    "statusDescription": "<value>"      // opt | Description of ReturnCode handed over from
                                        //       Task
  },
  "Log":                 "<value>"      // opt | Text-Block (single lines separated by '\n')
}
```

Middleware 306 can transmit final status 340 to API 304. API 304 can receive final status 340 and provide electronic information included in or associated with final status 340 to application 302 in the form of a final update 341. Application 302 can process final update 341 to update the status of the task package, the electronic information associated with the task, or both in one or more databases associated with application 302. In some aspects, application 302 can generate a response 342 that includes an HTTP status 200 or 400. API 304 can transmit response 342 to middleware 306.

Figure 4:
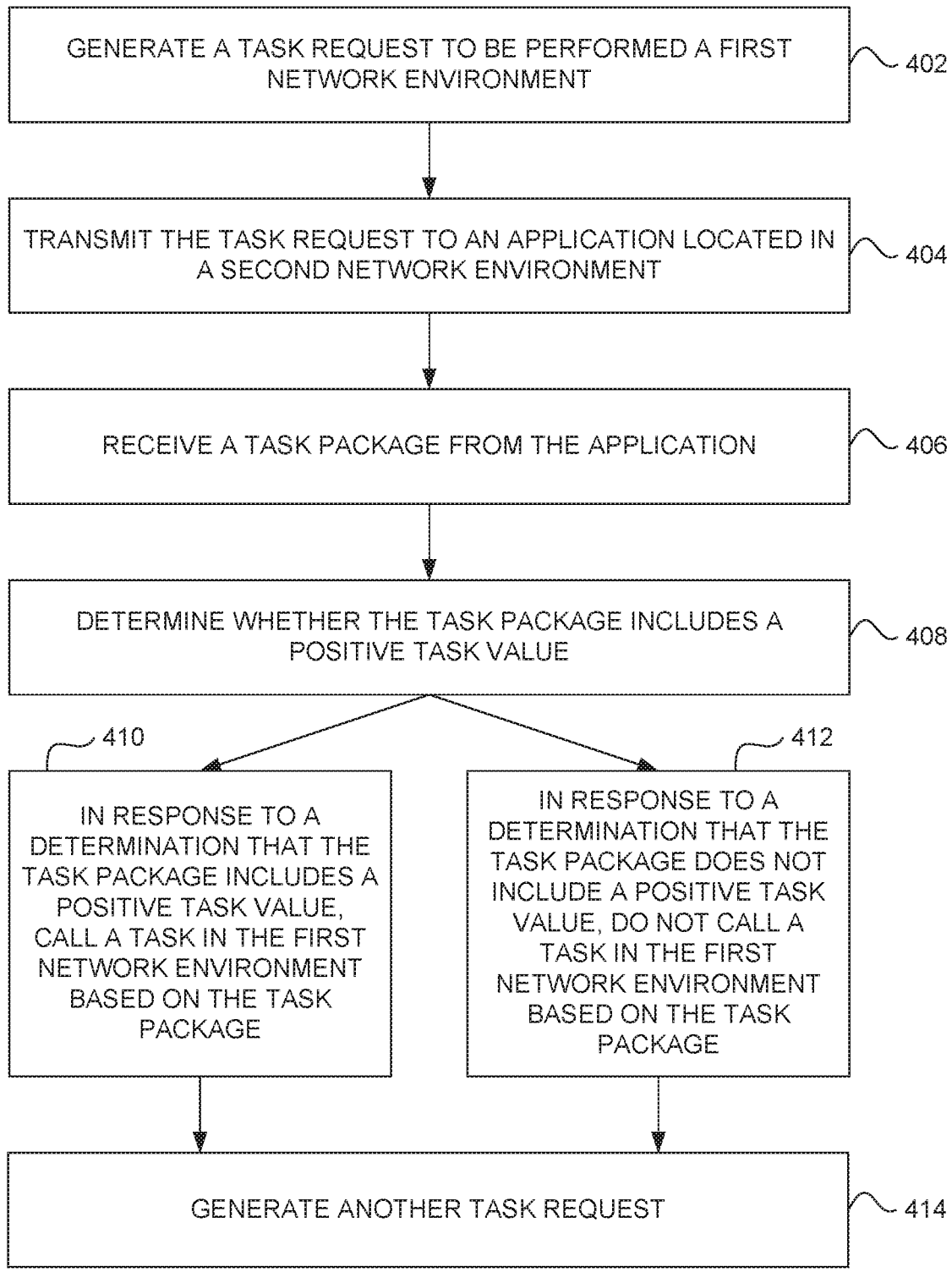
FIG. 4 is a flowchart illustrating a process for securing inter-network communications, according to some embodiments.

FIG. 4 is a flowchart for a method 400 for securing inter-network communications, according to an embodiment. Method 400 can be performed by processing logic that can include hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than shown in FIG. 4, as will be understood by a person of ordinary skill in the art.

Method 400 shall be described with reference to FIGS. 1A, 1B, and 1C. However, method 400 is not limited to those example embodiments.

In 402, system 100 (e.g., system 100A, 100B, 100C) can generate a task request for a task to be performed in a first network environment. The first network environment can be an intranet environment such as intranet system 102. In some embodiments, the first network environment can include continuous deployment system 110. Before 402, in some embodiments, system 100 can generate a middleware instance in the first network environment (e.g., in continuous deployment application 112 of continuous deployment system 110). The middleware instance can include middleware (e.g., middleware 114) configured to perform 402 and other steps described with reference to method 400. In some embodiments, the middleware can include a poll script. In an embodiment, 402 can be implemented according to the example pseudocode described with reference to task request 310 shown in FIG. 3. However, in other embodiments, 402 can be implemented using other code, pseudocode, algorithms, modification factors, or combinations thereof.

In 404, system 100 can transmit the task request to an application located in a second network environment. The second network environment can be an extranet environment such as PaaS system 140 or one or more other external systems 160. For example, the application can be, but is not limited to, application 142, 152, or 162. In some embodiments, the application can be prohibited from accessing the first network environment. For example, the first network environment can include a firewall (e.g., firewall 104) configured to prohibit the application from accessing the first network environment. In some embodiments, system 100 can transmit the task request to an API associated with the application, such as REST API 146, 156, or 166.

Further in 404, in some embodiments, system 100 can transmit the task request based on a task request transmission frequency. In some embodiments, system 100 can modify the task request transmission frequency based on overall workload. For example, every time the workload of a task package (e.g., task package 320) is greater than zero, system 100 can increase the frequency to process tasks and thus the task request transmission frequency, and vice versa. In some embodiments, system 100 can modify the task request transmission frequency based on one or more SLAs. For example, system 100 can receive or obtain an SLA indicating that it must process tasks in a given time. Subsequently, system 100 can modify the task request transmission frequency based on the SLA and, optionally, further based on overall workload. In some embodiments, system 100 can modify the task request transmission frequency based on a maintenance cycle (e.g., pause processing for a given timeframe during a planned maintenance cycle of, for example, SPC system 120 or continuous deployment system 130). In some embodiments, system 100 can modify the task request transmission frequency based on manual input (e.g., by admin UI 144).

In 406, system 100 can receive a task package (e.g., a working block) from the application. In some embodiments, system 100 can receive the task package from an API associated with the application, such as REST API 146, 156, or 166. In some embodiments, the task package can include a positive task value (e.g., "Work": "true"), a UUID, a workload, a task type, and a set of task parameters indicative of a task to be performed in the first network environment. In other embodiments, the task package may include a negative task value (e.g., "Work": "false") indicating that there is not a task to be performed in the first network environment at the time of the task request. In an embodiment, 406 can be implemented according to the example pseudocode described with reference to task package 320 shown in FIG. 3. However, in other embodiments, 406 can be implemented using other code, pseudocode, algorithms, modification factors, or combinations thereof.

In 408, system 100 determines whether the task package includes a positive task value indicating that there is a task to be performed in the first network environment. In response to determining that the task package includes a positive task value, 408 can proceed to 410. In response to determining that the task package does not include a positive task value (or, additionally or alternatively, that the task package includes a negative task value), 408 can proceed to 412.

In 410, system 100 can call a task in the first network environment based on the task package. In some embodiments, where the task package includes a task type and a set of task parameters, system 100 can call the task in the first network environment based on the task type and the set of task parameters. In some aspects, the task can be a provisioning task, a continuous deployment task, an admin UI task, or any other suitable task.

In one illustrative example, where the task type includes an SPC task type and a set of SPC task parameters, system 100 can call an SPC task in the first network environment based on the set of SPC task parameters. For example, middleware 114 can call an SPC task via service request API 122 of SPC system 120.

In another illustrative example, where the task type includes a continuous deployment task type and a set of continuous deployment task parameters, system 100 can call a continuous deployment task in the first network environment based on the set of continuous deployment task parameters. For example, middleware 114 can call a continuous deployment task via continuous deployment job 116 or 134 in continuous deployment application 112 or 132, respectively.

In yet another illustrative example, where the task type includes a PaaS environment manager task type and a set of PaaS environment manager task parameters, system 100 can call a PaaS environment manager task in the first network environment based on the set of PaaS environment manager task parameters. For example, middleware 114 can call a PaaS environment manager task via PaaS system command line interface 118.

Optionally, after 410 and in response to calling the task in the first network environment, system 100 can receive, at a first time, a first status associated with an execution of the task in the first environment, generate a creation status based on the first status, and transmit the creation status to the application located in the second network environment. The creation status can indicate that a creation of the task in the first environment started successfully or failed. In an embodiment, the creation status can be implemented according to the example pseudocode described with reference to creation status 330 shown in FIG. 3. However, in other embodiments, the creation status can be implemented using other code, pseudocode, algorithms, modification factors, or combinations thereof.

Optionally, system 100 thereafter can receive, at a second time later than the first time, a second status associated with the execution of the task in the first environment, generate a final status based on the second status, and transmit the final status to the application located in the second network environment. The final status can indicate that the task finished successfully or failed. In an embodiment, the final status can be implemented according to the example pseudocode described with reference to final status 340 shown in FIG. 3. However, in other embodiments, the final status can be implemented using other code, pseudocode, algorithms, modification factors, or combinations thereof.

In 412, system 100 can perform no action in the first network environment based on the task package (e.g., because no task has been requested by the application). For example, system 100 can call no task in the first network environment based on the task package.

In 414, system 100 can generate another task request for a task to be performed the first network environment. In some aspects, system 100 can generate this task request based on a task request transmission frequency (e.g., after waiting 30 seconds based on a task request transmission frequency equal to 30 seconds). In one illustrative and non-limiting example, where the task request is a first task request and the task package is a first task package that does not include a first positive task value, system 100 can generate a second task request to be performed the first network environment in response to determining that the first task package does not include the first positive task value. System 100 then can transmit (e.g., in accordance with the task request transmission frequency) the second task request to the application located in the second network environment and receive a second task package (e.g., a second working block) from the application. Subsequently, system 100 can determine whether the second task package includes a second positive task value, if so, call a second task in the first network environment based on the second task package.

Figure 5:
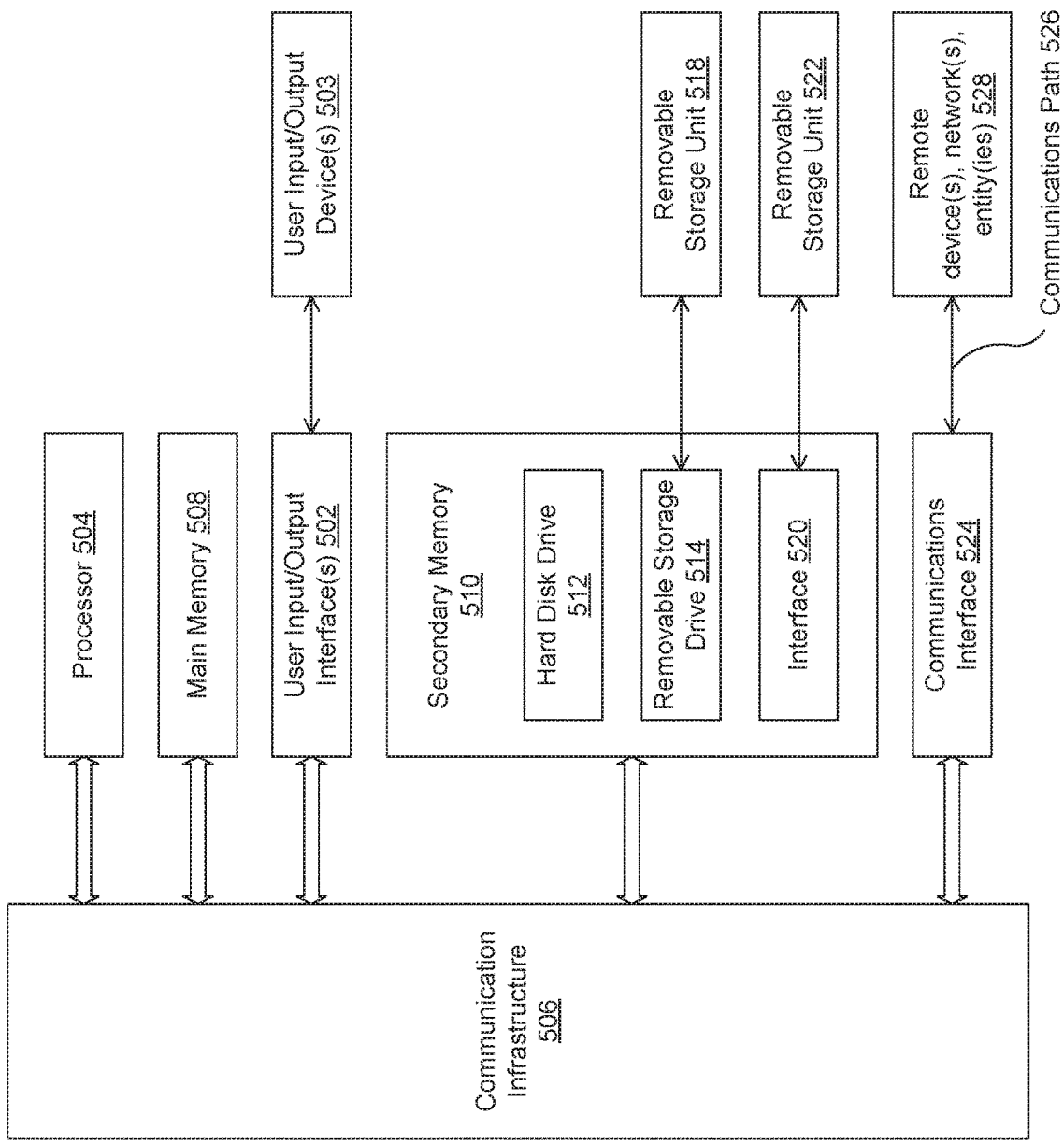
FIG. 5 is an example computer system useful for implementing various embodiments.

Various embodiments may be implemented, for example, using one or more well-known computer systems, such as computer system 500 shown in FIG. 5. Computer system 500 may be used, for example, to implement any of the embodiments discussed herein, as well as combinations and sub-combinations thereof.

Computer system 500 may include one or more processors (also called central processing units, or CPUs), such as a processor 504. Processor 504 may be connected to a communication infrastructure or bus, such as communication infrastructure 506.

Computer system 500 may also include user input/output device(s) 503, such as monitors, keyboards, pointing devices, etc., which may communicate with communication infrastructure 506 through user input/output interface(s) 502.

Processor 504 may include a graphics processing unit (GPU). In an embodiment, a GPU may be a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 500 may also include a main memory 508, such as random access memory (RAM). Main memory 508 may include one or more levels of cache. Main memory 508 may have stored therein control logic (e.g., computer software) and/or data.

Computer system 500 may also include one or more secondary storage devices, such as secondary memory 510. Secondary memory 510 may include, for example, a hard disk drive 512 and/or a removable storage drive 514. Removable storage drive 514 may be a floppy disk drive, a magnetic tape drive, a compact disk drive, an optical storage device, tape backup device, and/or any other storage device/drive.

Removable storage drive 514 may interact with a removable storage unit 518. Removable storage unit 518 may include a computer usable or readable storage device having stored thereon computer software (control logic) and/or data. Removable storage unit 518 may be a floppy disk, magnetic tape, compact disk, DVD, optical storage disk, and/any other computer data storage device. Removable storage drive 514 may read from and/or write to removable storage unit 518.

Secondary memory 510 may include other means, devices, components, instrumentalities or other approaches for allowing computer programs and/or other instructions and/or data to be accessed by computer system 500. Such means, devices, components, instrumentalities or other approaches may include, for example, a removable storage unit 522 and an interface 520. Examples of removable storage unit 522 and interface 520 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 500 may further include a communication or network interface, such as communication interface 524. Communication interface 524 may enable computer system 500 to communicate and interact with any combination of external devices, external networks, external entities, etc. (individually and collectively referenced by reference number 528). For example, communication interface 524 may allow computer system 500 to communicate with external or remote devices 528 over communication path 526, which may be wired and/or wireless (or a combination thereof), and which may include any combination of LANs, WANs, the Internet, etc. Control logic and/or data may be transmitted to and from computer system 500 via communication path 526.

Computer system 500 may also be any of a personal digital assistant (PDA), desktop workstation, laptop or notebook computer, netbook, tablet, smart phone, smart watch or other wearable, appliance, part of the Internet-of-Things, and/or embedded system, to name a few non-limiting examples, or any combination thereof.

Computer system 500 may be a client or server, accessing or hosting any applications and/or data through any delivery paradigm, including but not limited to remote or distributed cloud computing solutions; local or on-premises software ("on-premise" cloud-based solutions); "as a service" models (e.g., BaaS, MBaaS, CaaS, DCaaS, DaaS, FaaS, IaaS, PaaS, SaaS, MSaaS, any other suitable "as a service" model, or any combination thereof); and/or a hybrid model including any combination of the foregoing examples or other services or delivery paradigms.

Any applicable data structures, file formats, and schemas in computer system 500 may be derived from standards including but not limited to JSON, Extensible Markup Language (XML), Yet Another Markup Language (YAML), Extensible Hypertext Markup Language (XHTML), Wireless Markup Language (WML), MessagePack, XML User Interface Language (XUL), or any other functionally similar representations alone or in combination. Alternatively, proprietary data structures, formats or schemas may be used, either exclusively or in combination with known or open standards.

In some embodiments, a tangible, non-transitory apparatus or article of manufacture including a tangible, non-transitory computer useable or readable medium having control logic (software) stored thereon may also be referred to herein as a computer program product or program storage device. This includes, but is not limited to, computer system 500, main memory 508, secondary memory 510, and removable storage units 518 and 522, as well as tangible articles of manufacture embodying any combination of the foregoing. Such control logic, when executed by one or more data processing devices (such as computer system 500), may cause such data processing devices to operate as described herein.

Based on the teachings contained in this disclosure, it will be apparent to persons skilled in the relevant art(s) how to make and use embodiments of this disclosure using data processing devices, computer systems and/or computer architectures other than that shown in FIG. 5. In particular, embodiments can operate with software, hardware, and/or operating system implementations other than those described herein.

There are many exemplary aspects to the system, apparatus, device, method and/or computer program product embodiments, and/or combinations and sub-combinations thereof, disclosed herein. For example, embodiments of the present disclosure provide for increased automation of the continuous deployment process without additional manual interaction. In another example, embodiments of the present disclosure provide for closing gaps inside of E2E processes targeting infrastructure inside and outside of an entity's internal network as well as demilitarized zones (DMZs). As a result of these and other embodiments described herein, any kind of restriction between two networks having the ability to open communications in one direction can be bypassed and, in some embodiments, media breaks can be completely closed. As a further result of these and other embodiments described herein, total cost of ownership (TCO) is decreased, human error is decreased, and system efficiency, interoperability, and performance is increased.

It is to be appreciated that the Detailed Description section, and not any other section, is intended to be used to interpret the claims. Other sections can set forth one or more but not all example embodiments as contemplated by the inventor(s), and thus, are not intended to limit this disclosure or the appended claims in any way.

While this disclosure describes example embodiments for example fields and applications, it should be understood that the disclosure is not limited thereto. Other embodiments and modifications thereto are possible, and are within the scope and spirit of this disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments can perform functional blocks, steps, operations, methods, etc. using orderings different than those described herein.

References herein to "one embodiment," "an embodiment," "an example embodiment," or similar phrases, indicate that the embodiment described can include a particular feature, structure, or characteristic, but every embodiment can not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein. Additionally, some embodiments can be described using the expression "coupled" and "connected" along with their derivatives. These terms are not necessarily intended as synonyms for each other. For example, some embodiments can be described using the terms "connected" and/or "coupled" to indicate that two or more elements are in direct physical or electrical contact with each other. The term "coupled," however, can also mean that two or more elements are not in direct contact with each other, but yet still co-operate or interact with each other.

The breadth and scope of this disclosure should not be limited by any of the above-described example embodiments, but should be defined only in accordance with the following claims and their equivalents.

What is claimed is:

1. A computer-implemented method for securing inter-network communications, comprising:
    determining that a provisioning task request from an external application on a second network environment, external to a first network environment, is stored in a database, the provisioning task request comprising a request for a provisioning task to be performed by one or more devices inside the first network environment, wherein the first network environment comprises a firewall configured to prohibit the external application from directly accessing the first network environment through the firewall;
    generating, by at least one processor, a task request corresponding to the provisioning task request by the external application to be performed in the first network environment;
    transmitting, by the at least one processor, the task request to an application programming interface (API) configured to communicate with the external application through the firewall, wherein the API is located within the second network environment;
    receiving, by the at least one processor, a task package from the external application;
    determining, by the at least one processor, whether the task package comprises a positive task value;
    in response to determining that the task package comprises the positive task value, calling, by the at least one processor, the task in the first network environment based on the task package; and
    transmitting a result of a performance of the task in the first network environment to the API, wherein the API is configured to communicate a status to the external application.

2. The method of claim 1, wherein the generating the task request comprises generating, by the at least one processor, the task request based on a poll script.

3. The method of claim 1, wherein:
    the first network environment is an intranet environment; and
    the second network environment is an extranet environment.

4. The method of claim 1, wherein:
    the transmitting further comprises: transmitting, by the at least one processor, the task request to the application programming interface (API) associated with the external application; and
    the receiving further comprises: receiving, by the at least one processor, the task package from the API associated with the external application.

5. The method of claim 4, wherein the API is a representational state transfer (REST) API.

6. The method of claim 1, the transmitting further comprising transmitting, by the at least one processor, the task request based on a task request transmission frequency.

7. The method of claim 1, wherein the positive task value indicates that there is a task to be performed inside the first network environment corresponding to the task package.

8. A system, comprising:
    a memory; and
    at least one processor coupled to the memory and configured to perform operations comprising:
    determining that a provisioning task request from an external application on a second network environment, external to a first network environment, is stored in a database, the provisioning task request comprising a request for a provisioning task to be performed by one or more devices inside the first network environment, wherein the first network environment comprises a firewall configured to prohibit the external application from directly accessing the first network environment through the firewall;
    generating a task request corresponding to the provisioning task request by the external application to be performed in the first network environment;
    transmitting the task request to an application programming interface (API) configured to communicate with the external application through the firewall, wherein the API is located within the second network environment;

receiving a task package from the external application;

determining whether the task package comprises a positive task value;

in response to a determination that the task package comprises the positive task value, calling the task in the first network environment based on the task package; and transmitting a result of a performance of the task in the first network environment to the API, wherein the API is configured to communicate a status to the external application.

9. The system of claim 8, wherein to generate the task request, the at least one processor is configured to generate the task request based on a poll script.

10. The system of claim 8, wherein:
the first network environment is an intranet environment; and
the second network environment is an extranet environment.

11. The system of claim 8, wherein:
transmitting the task request comprises: transmitting the task request to the application programming interface (API) associated with the external application; and
receiving the task package comprises: receiving the task package from the API associated with the external application.

12. The system of claim 8, wherein to transmit the task request, the at least one processor is configured to transmit the task request based on a task request transmission frequency.

13. A non-transitory computer-readable medium having instructions stored thereon that, when executed by at least one computing device, cause the at least one computing device to perform operations comprising:

determining that a provisioning task request from an external application on a second network environment, external to a first network environment is stored in a database, the provisioning task request comprising a request for a provisioning task to be performed by one or more devices inside the first network environment, wherein the first network environment comprises a firewall configured to prohibit the external application from directly accessing the first network environment through the firewall;

generating, by at least one processor, a task request corresponding to the provisioning task request by the external application to be performed in the first network environment;

transmitting, by the at least one processor, the task request to an application programming interface (API) configured to communicate with the external application through the firewall, wherein the API is located within the second network environment;

receiving, by the at least one processor, a task package from the external application;

determining, by the at least one processor, whether the task package comprises a positive task value;

in response to determining that the task package comprises the positive task value, calling, by the at least one processor, the task in the first network environment based on the task package; and transmitting a result of a performance of the task in the first network environment to the API, wherein the API is configured to communicate a status to the external application.

14. The non-transitory computer-readable medium of claim 13, wherein the generating the task request comprises generating the task request based on a poll script.

15. The non-transitory computer-readable medium of claim 13, wherein:
the first network environment is an intranet environment; and
the second network environment is an extranet environment.

16. The non-transitory computer-readable medium of claim 13, wherein:
the transmitting further comprises: transmitting the task request to the application programming interface (API) associated with the external application; and
the receiving further comprises: receiving the task package from the API associated with the external application.

17. The non-transitory computer-readable medium of claim 16, wherein:
the API is a representational state transfer (REST) API; and
the transmitting comprises transmitting the task request based on a task request transmission frequency.

* * * * *